(12) United States Patent
Miyata et al.

(10) Patent No.: US 8,001,557 B2
(45) Date of Patent: Aug. 16, 2011

(54) SLOT-IN TYPE DISK APPARATUS

(75) Inventors: Koji Miyata, Ehime (JP); Shinichi Wada, Ehime (JP)

(73) Assignee: Panasonic Corporation, Osaka (JP)

( * ) Notice: Subject to any disclaimer, the term of this patent is extended or adjusted under 35 U.S.C. 154(b) by 351 days.

(21) Appl. No.: 12/159,193

(22) PCT Filed: Nov. 13, 2006

(86) PCT No.: PCT/JP2006/322568
§ 371 (c)(1),
(2), (4) Date: Feb. 6, 2009

(87) PCT Pub. No.: WO2007/077679
PCT Pub. Date: Jul. 12, 2007

(65) Prior Publication Data
US 2010/0223635 A1 Sep. 2, 2010

(30) Foreign Application Priority Data
Dec. 28, 2005 (JP) ................. 2005-378945

(51) Int. Cl.
*G11B 17/04* (2006.01)
(52) U.S. Cl. ..................................... 720/620
(58) Field of Classification Search ........... 720/623, 720/711, 646, 624, 601, 602, 603, 604, 605, 720/606, 621, 619, 713, 615, 626, 620, 704, 720/671, 673, 681, 649, 648, 690, 714, 675, 720/692, 666, 661, 638
See application file for complete search history.

(56) References Cited

U.S. PATENT DOCUMENTS
2002/0041563 A1  4/2002  Shinozuka et al.
(Continued)

FOREIGN PATENT DOCUMENTS
JP          5-325497       12/1993
(Continued)

OTHER PUBLICATIONS
International Search Report dated Dec. 12, 2006.

*Primary Examiner* — Allen T Cao
(74) *Attorney, Agent, or Firm* — Dickinson Wright PLLC

(57) ABSTRACT

It is an object of the present invention to provide a slot-in type disk apparatus in which a moving position of a disk is precisely guided when the disk is inserted or discharged, thereby preventing the disk from coming into contact with an objective lens and further reducing the thickness of the disk apparatus. In the slot-in type disk apparatus, a base body 10 and a lid constitute a chassis sheath, a disk-insertion opening 11 into which a disk is directly inserted is formed in a front surface of the chassis sheath, a traverse base 30 is disposed on the side of a front surface of the base body 10, a pickup 32 held by the traverse base 30 is disposed on an outer peripheral side of the base body 10, the pickup 32 is provided with an objective lens 32A and an ACT cover 32B, the traverse base 30 is provided with a traverse base 30 cover 32B, and a protection cover 32B is provided on an upper surface on the side of an outer periphery of the traverse base 30 cover 32B, the protection cover 32B also extends above the ACT cover 32B and is disposed closer to the disk-insertion opening 11 than the objective lens 32A.

4 Claims, 2 Drawing Sheets

U.S. PATENT DOCUMENTS

2010/0299684 A1* 11/2010 Huang et al. .................. 720/620
2010/0313211 A1* 12/2010 Katsuki ........................ 720/620

FOREIGN PATENT DOCUMENTS

| JP | 6-005062 | 1/1994 |
| JP | 11-053848 | 2/1999 |
| JP | 2000-057601 | 2/2000 |
| JP | 2002-352498 | 12/2002 |
| JP | 2003-030941 | 1/2003 |

* cited by examiner

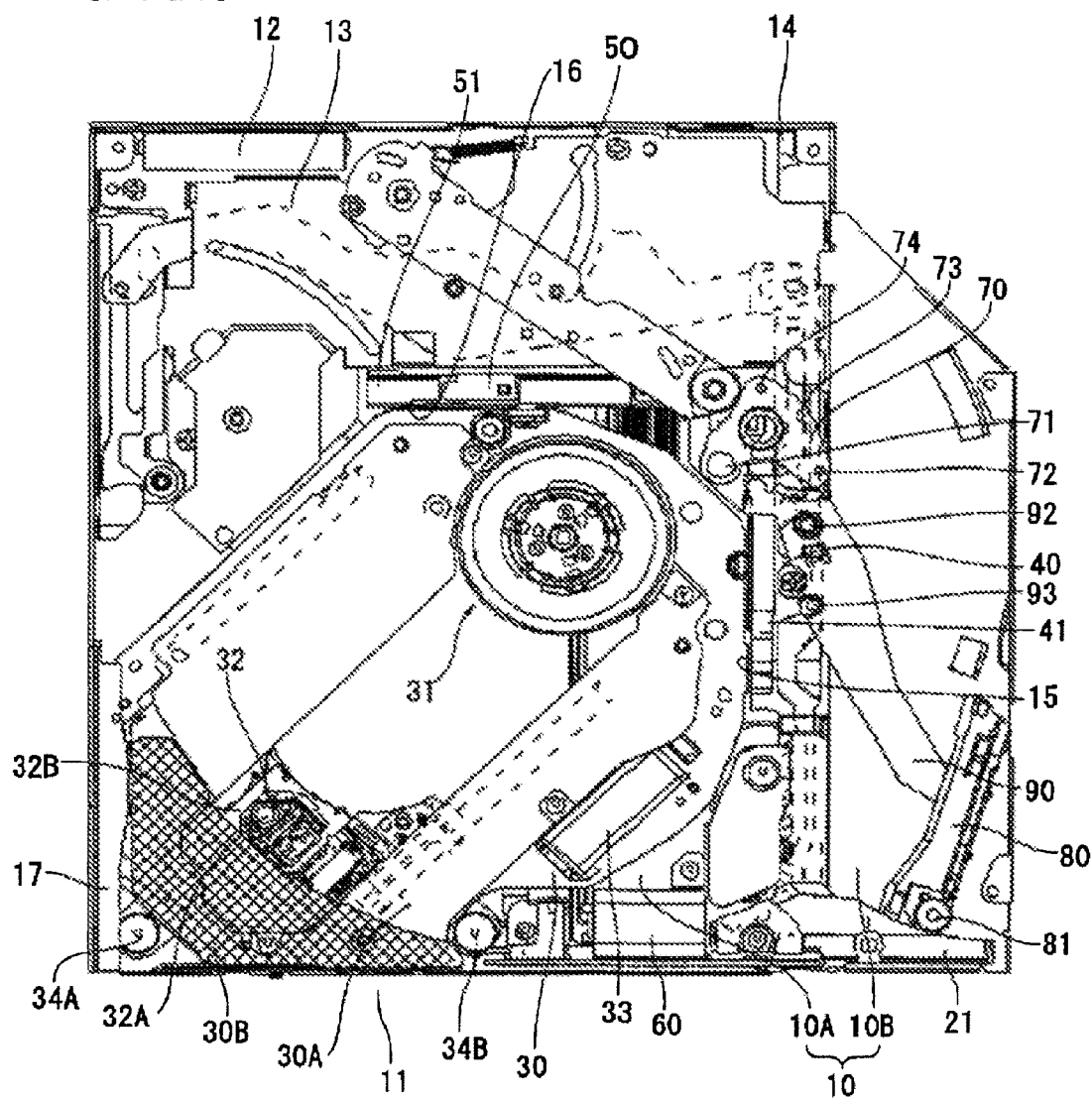
[FIG1]

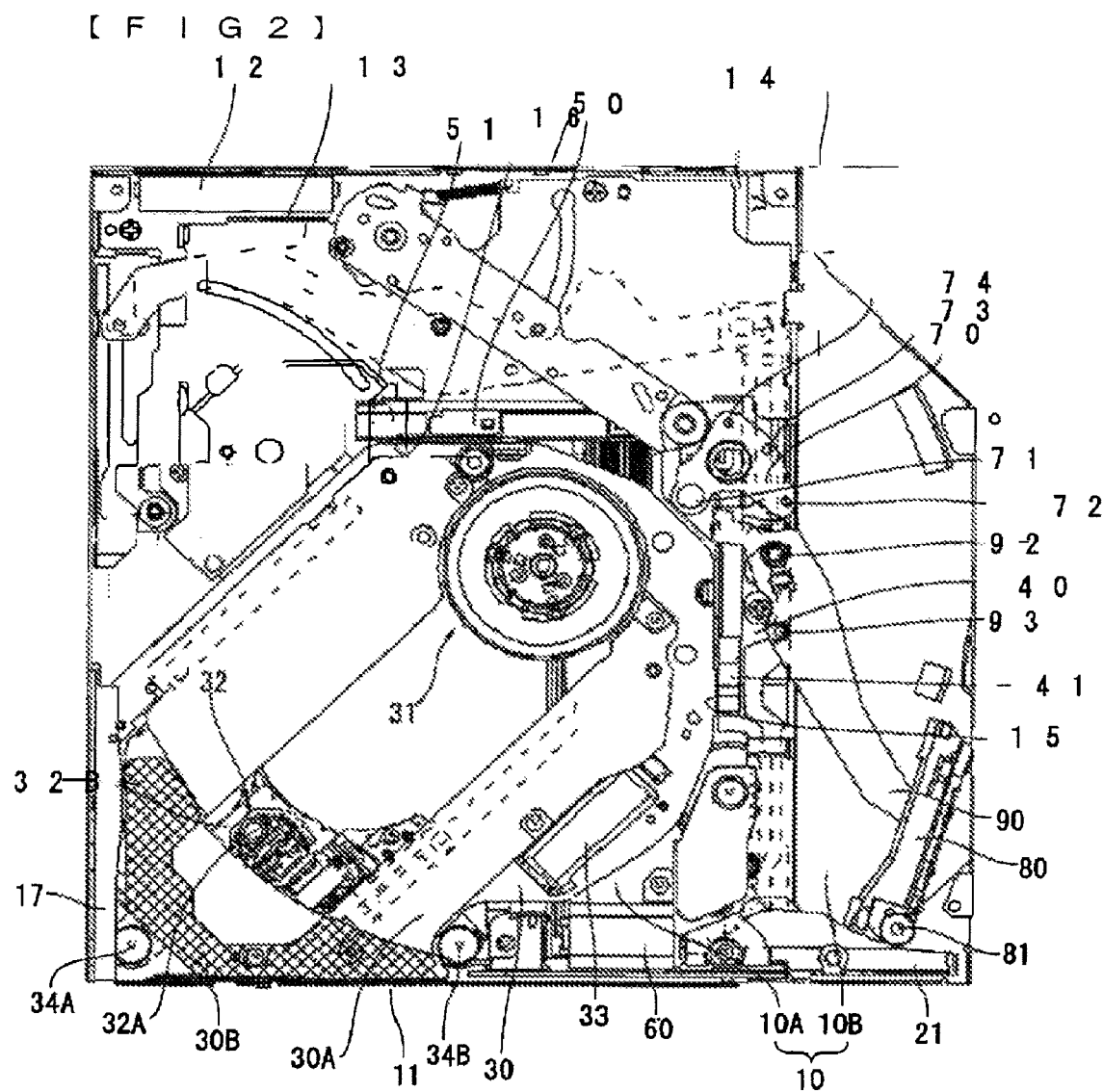
[FIG 2]

SLOT-IN TYPE DISK APPARATUS

TECHNICAL FIELD

The present invention relates to a disk apparatus for recording or replaying into or from a disk-like recording medium such as a CD and a DVD, and more particularly, to a slot-in type disk apparatus into which and from which a disk can directly be inserted or discharged.

BACKGROUND TECHNIQUE

According to a conventional disk apparatus, there is widely employed a loading system in which a disk is placed on a tray or a turntable, and the tray or the turntable is loaded into an apparatus body. According to such a loading system, since the tray or the turntable is required, there is a limit to reduce the thickness of the disk apparatus body. Therefore, there recently exists a slot-in type disk apparatus in which a disk is directly operated by a lever or the like using a loading motor (e.g., patent document 1).
[Patent Document 1] Japanese Patent Application Laid-open No. 2002-352498

DISCLOSURE OF THE INVENTION

Problem to be Solved by the Invention

However, even according to a slot-in type disk apparatus in which a disk is directly operated by the lever or the like, in order to thin the apparatus, it is necessary to guide a disk appropriately so that the disk does not come into contact with an objective lens of a pickup when the disk is inserted or discharged.

Hence, it is an object of the present invention to provide a slot-in type disk apparatus in which a moving position of a disk when the disk is inserted and discharged is precisely guided, thereby preventing the disk from coming into contact with an objective lens, and further reducing the thickness of the disk apparatus.

Means for Solving the Problem

A first aspect of the present invention provides a slot-in type disk apparatus in which a base body and a lid constitute a chassis sheath, a disk-insertion opening into which a disk is directly inserted is formed in a front surface of the chassis sheath, a traverse base is disposed on the side of a front surface of the base body, a pickup held by the traverse base is disposed on an outer peripheral side of the base body at the time of standby, the pickup is provided with an objective lens and an ACT cover, the traverse base is provided with a traverse base cover, and a protection cover is provided on an upper surface on the side of an outer periphery of the traverse base cover, wherein the protection cover also extends above the ACT cover and is disposed closer to the disk-insertion opening than the objective lens.

According to a second aspect of the invention, in the slot-in type disk apparatus of the first aspect, an upper surface of the protection cover is coated with urethane fluorine.

According to a third aspect of the invention, in the slot-in type disk apparatus of the first aspect, at least an upper surface of the protection cover is made of felt material.

According to a fourth aspect of the invention, in the slot-in type disk apparatus of the first aspect, a height of the protection cover located above the ACT cover is lower than that of the protection cover located on an upper surface of the traverse base cover.

Effect of the Invention

According to the present invention, since it is possible to prevent a disk from coming into contact with an objective lens when the disk is inserted, the thickness of the disk apparatus can be reduced.

BRIEF DESCRIPTION OF THE DRAWINGS

FIG. 1 is a plan view of a base body of a disk apparatus according to an embodiment of the present invention; and
FIG. 2 is a plan view of a base body of a disk apparatus according to another embodiment of the invention.

EXPLANATION OF SYMBOLS

10 base body
11 disk-insertion opening
13 rear base
30 traverse base
30A traverse base cover
30B protection cover
32 pickup
32A objective lens
32B ACT cover

BEST MODE FOR CARRYING OUT THE INVENTION

According to the slot-in type disk apparatus of the first aspect of the invention, the protection cover also extends above the ACT cover and is disposed closer to the disk-insertion opening than the objective lens. With this aspect, since the protection cover is also provided above the ACT cover and closer to the side of the disk-insertion opening than the objective lens, it is possible to prevent a disk from coming into contact with the objective lens when the disk is inserted.

According to the second embodiment, in the slot-in type disk apparatus of the first aspect, an upper surface of the protection cover is coated with urethane fluorine. With this aspect, even if a disk comes into contact with the protection cover, the disk is not damaged.

According to the third embodiment, in the slot-in type disk apparatus of the first aspect, at least an upper surface of the protection cover is made of felt material. With this aspect, even if a disk comes into contact with the protection cover, the disk is not damaged.

According to the fourth embodiment, in the slot-in type disk apparatus of the first aspect, a height of the protection cover located above the ACT cover is lower than that of the protection cover located on an upper surface of the traverse base cover. With this aspect, since a data surface of a disk does not comes into contact with the protection cover, it is unnecessary to coat a surface of the protection cover.

Embodiment 1

A disk apparatus according to an embodiment of the present invention will be explained.
FIG. 1 is a plan view of a base body of a disk apparatus according to the embodiment of the invention.
According to the disk apparatus of the embodiment, a base body and lid constitute a chassis sheath, and a bezel is attached to a front surface of the chassis sheath. The disk apparatus of the embodiment is a slot-in type disk apparatus in which a disk is directly inserted from a disk-insertion opening formed in the bezel.

As shown in FIG. 1, parts which realize the recording and replaying function onto or from a disk and a loading function of a disk are attached to the base body 10.

The base body 10 is formed with a deep bottom 10A and a shallow bottom 10B. A wing portion extending from a front surface to a rear surface is formed by the shallow bottom 10B.

The base body 10 is formed at its front side with a disk-insertion opening 11 into which a disk is directly inserted, and a connector 12 is disposed on an end of a rear surface of the base body 10. A traverse base 30 is disposed on the base body 10 on the side of the disk-insertion opening 11, and a rear base 13 is disposed on the base body 10 on the side of the connector 12. The traverse base 30 and the rear base 13 are disposed such that they are not superposed on each other. A printed board 14 is provided on the rear base 13 on the side of the surface of the base body 10.

The traverse base 30 holds a spindle motor 31, a pickup 32 and driving means 33 which moves the pickup 32. The spindle motor 31 is provided on the one end side of the traverse base 30, and the pickup 32 is provided such that the pickup 32 can move from one end to the other end of the traverse base 30. When the pickup 32 is in a standby state, the pickup 32 is disposed on the other end side of the traverse base 30, I.E., on the side of an outer periphery of the base body 10.

In the traverse base 30, the spindle motor 31 is located at a central portion of the base body 10, a reciprocating range of the pickup 32 is located closer to the disk-insertion opening 11 than the spindle motor 31, and the reciprocating direction of the pickup 32 is different from the insertion direction of the disk. Here, an angle of 35° to 55° is formed between the reciprocating direction of the pickup 32 and the insertion direction of a disk.

The traverse base 30 is supported on the base body 10 by a pair of insulators 34A and 34B. A traverse base cover 30A is provided on the traverse base 30 on the side of the lid. A protection cover 30B is provided on an outer surface on the side of the outer periphery of the traverse base cover 30A.

The pickup 32 is provided with an objective lens 32A and an ACT cover 32B covering an actuator.

The protection cover 30B also extends to a location above the ACT cover 32B, and the protection cover 30B is also disposed closer to the disk-insertion opening than the objective lens 32A. At least an upper surface is made of felt material or the upper surface is coated with urethane fluorine. As the coating material, it is possible to apply, to urethane resin having bead diameter of 20 micron, fluorine coating having urethane beads in which 5% of fluorine is mixed in urethane resin and 1.0 to 1.5% of silicon is mixed in urethane resin. It is preferable that a friction coefficient of the coating material is in a range of 0.2 to 0.6, and more preferably equal to 0.55 or less.

If the protection cover 30B is provided above the ACT cover 32B and closer to the disk-insertion opening than the objective lens 32A, it is possible to prevent a disk and the pickup 32 from interfering with each other when the disk is inserted.

Especially since the height of the protection cover 30B on the ACT cover 32B is high in the apparatus, there is a possibility that the protection cover 30B rubs against the disk and damages the disk when the disk is inserted. Therefore, it is preferable that the protection cover 30B is covered with felt material or is coated with another material so that a disk is not damaged.

The pair of insulators 34A and 34B are disposed closer to a stationary position of the pickup 32 than the position of the spindle motor 31. In this embodiment, the insulator 34A is provided on the side of one end near the inner side of the disk-insertion opening 11, and the insulator 34B is provided at a central portion near the inner side of the disk-insertion opening 11. The insulators 34A and 34B includes damper mechanisms made of elastic material. The traverse base 30 brings the spindle motor 31 toward the base body 10 and away from the base body 10 around the insulators 34A and 34B as fulcrums.

A main slider 40 and a sub-slider 50 and a sub-slider 50 having cam mechanisms will be explained below. The cam mechanisms which displace the traverse base 30 are respectively provided on the main slider 40 and the sub-slider 50. The main slider 40 and the sub-slider 50 are disposed on the side of the spindle motor 31. The main slider 40 is disposed such that its one end comes on the side of a front surface of the chassis body 10 and its other end comes on the side of a rear surface of the chassis body 10. The sub-slider 50 is disposed between the traverse base 30 and the rear base 13 in a direction perpendicular to the main slider 40.

The cam mechanisms which displace the traverse base 30 comprise a first cam mechanism 41 and a second cam mechanism 51. The first cam mechanism 41 is provided on a surface of the main slider 40 on the side of the spindle motor 31, and the second cam mechanism 51 is provided on the sub-slider 50 on the side of the spindle motor 31.

A base member 15 is provided between the main slider 90 and the traverse base 30. A base member 16 is provided between the sub-slider 50 and the traverse base 30. The base member 15 and the base member 16 are fixed to the base body 10. A position of a cam pin of the traverse base 30 is limited by a vertical groove formed in the base member 15, and a position of the cam pin of the traverse base 30 is limited by a vertical groove formed in the base member 16.

The base member 16 and the sub-slider 50 are connected to each other through a third cam mechanism (not shown). The third cam mechanism has a function for moving the sub-slider 50 away from the base body 10 when the traverse base 30 is moved away from the base body 10 by the second cam mechanism 51.

A loading motor 60 is disposed on the side of one end of the main slider 40. A drive shaft of the loading motor 60 and the one end of the main slider 40 are connected to each other through a gear mechanism.

By driving the loading motor 60, the main slider 40 can slide in the longitudinal direction. The main slider 40 is connected to the sub-slider 50 by a cam lever 70.

The cam lever 70 includes a turning fulcrum 71, a pin 72, a pin 73 and a pin 74. The pins 72 and 73 engage with a cam groove formed in an upper surface of the main slider 40, the pin 74 engages with a cam groove formed in an upper surface of the sub-slider 50, and the cam lever 70 turns around a turning fulcrum 71 as an axis.

The above-explained connector 12, traverse base 30, rear base 13, printed board 14, insulators 34A and 34B, main slider 40, sub-slider 50 and loading motor 60 are provided on the deep bottom 10A of the base body 10, and form a disk inserting space between these members and the lid.

Next, a guide member for supporting a disk when the disk is to be inserted, and a lever member which operates when a disk is inserted will be explained below.

A first disk guide 17 having a predetermined length is provided on the side of one end of the deep bottom 10A near the disk-insertion opening 11. The first disk guide 17 has a groove having a U-shaped cross section as viewed from the disk inserting side. A disk is supported by this groove.

A pull-in lever 80 is provided on the shallow bottom 10B on the side of the disk-insertion opening 11. A second disk guide 81 is provided on a movable side end of the pull-in lever 80. The second disk guide 81 comprises a cylindrical roller, and is turnably provided on the movable end of the pull-in lever 80. A groove is formed in a roller outer periphery of the second disk guide 81, and a disk is supported by this groove.

The movable end of the pull-in lever 80 is operated closer to the disk-insertion opening 11 than the stationary side. The pull-in lever 80 has a turning fulcrum on the stationary end.

The pull-in lever 80 is operated by a sub-lever 90.

The sub-lever 90 has a projection on the movable side one end, and a turning fulcrum 92 on the other end. The projection of the sub-lever 90 slides in a long groove in the pull-in lever 80. The turning fulcrum 92 of the sub-lever 90 is located on the main slider 40. The turning fulcrum 92 is not operated in association with the main slider 40, and is fixed to the base 10. A pin 93 is provided on a lower surface of the sub-lever 90 at a location closer to the projection than the turning fulcrum 92. The pin 93 slides in the cam groove formed in an upper surface of the main slider 40. Therefore, the angle of the sub-lever 90 is changed as the main slider 40 moves, and if the angle of the sub-lever 90 is changed, the turning angle of the pull-in lever 80 is changed. That is, the second disk guide 81 of the pull-in lever 80 moves toward and away from the spindle motor 31 by the operation of the sub-lever 90.

The base body 10 is provided at its front side with a front guider 21. The front guider 21 is provided on the side of one end of the disk-insertion opening 11, and is disposed between the pull-in lever 80 and the disk-insertion opening 11. The front guider 21 is provided closer to the lid than the loading motor 60, the gear mechanism and the main slider 40 such as to cover portions of the loading motor 60, the gear mechanism and the main slider 40.

The operation of the cam lever will be explained below.

While the pin 73 is in engagement with the cam groove of the main slider 40, the cam lever 70 does not turn. This state is the standby state. This state continues for a while even after a disk is loaded, and the traverse base 30 is close to the base body 10.

The pin 73 comes out from the cam groove of the main slider 40 when the center of the disk comes above the spindle motor 31, and the cam lever 70 starts turning.

The first cam mechanism 41 provided on the main slider 40 moves in the same direction as the main slider 40. The main slider 40 has a groove in which the pin 72 of the cam lever 70 slides, the sub-slider 50 moves by turning the cam lever 70, and if the sub-slider 50 moves, the second cam mechanism 51 moves.

That is, if the main slider 40 moves, the first cam mechanism 41 moves by a predetermined distance, and if the cam lever 70 turns, the second cam mechanism 51 moves by a predetermined distance and the traverse base 30 is displaced.

When the chucking motion is completed, the turning motion of the cam lever 70 is completed.

According to this embodiment, the protection cover 30B also extends above the ACT cover 32B, and is disposed closer to the disk-insertion opening than the objective lens 32A. Therefore, it is possible to prevent a disk from coming into contact with the objective lens 32A when the disk is inserted.

Embodiment 2

FIG. 2 is a plan view of the base body of the disk apparatus according to another embodiment. The same members as those in the first embodiment will be designated with the same symbols, and explanation thereof will be omitted.

In this embodiment, the height of the protection cover 30B located above the ACT cover 32B is lower than that of the protection cover 30B located on the upper surface of the traverse base cover 30A, and the protection cover 30B located above the ACT cover 32B is not coated.

According to this embodiment, it is possible to prevent a data surface of a disk from coming into contact with the protection cover 30B.

This application is based upon and claims the benefit of priority of Japanese Patent Application NO. 2005-378945 filed on Dec. 28, 2005, the contents of which are incorporated herein by reference in its entirety.

INDUSTRIAL APPLICABILITY

In a disk apparatus for recording or replaying into or from a disk-like recording medium such as a CD and a DVD, the present invention can be utilized for a disk apparatus which is used as a domestic video device or a peripheral device, and which needs to be reduced in size.

The invention claimed is:

1. A slot-in type disk apparatus in which
a base body and a lid constitute a chassis sheath,
a disk-insertion opening into which a disk is directly inserted is formed in a front surface of the chassis sheath,
a traverse base is disposed on the side of a front surface of the base body,
a pickup held by the traverse base is disposed on an outer peripheral side of the base body at the time of standby,
the pickup is provided with an objective lens and an actuator cover,
the traverse base is provided with a traverse base cover, and
a protection cover is provided on an upper surface on the side of an outer periphery of the traverse base cover, wherein
the protection cover also extends above the actuator cover and is disposed closer to the disk-insertion opening than the objective lens.

2. The slot-in type disk apparatus according to claim 1, wherein an upper surface of the protection cover is coated with urethane fluorine.

3. The slot-in type disk apparatus according to claim 1, wherein at least an upper surface of the protection cover is made of felt material.

4. The slot-in type disk apparatus according to claim 1, wherein a height of the protection cover located above the actuator cover is lower than that of the protection cover located on an upper surface of the traverse base cover.

* * * * *